United States Patent [19]

Layne et al.

[11] Patent Number: 5,462,369
[45] Date of Patent: Oct. 31, 1995

[54] BEARING LOCK SYSTEM

[75] Inventors: James L. Layne, Scottsville; Mark T. Johnson, Glasgow, both of Ky.

[73] Assignee: Span Tech Corporation, Glasgow, Ky.

[21] Appl. No.: 336,598

[22] Filed: Nov. 9, 1994

[51] Int. Cl.⁶ .......................... F16C 43/00; F16B 21/18
[52] U.S. Cl. .................. 384/538; 384/539; 384/585; 384/903; 403/327; 403/383; 403/409.1
[58] Field of Search .................... 384/537, 538, 384/539, 585, 903; 403/327, 383, 409.1

[56] References Cited

U.S. PATENT DOCUMENTS

| | | | |
|---|---|---|---|
| 1,909,230 | 5/1933 | Smith | 384/539 |
| 2,118,885 | 5/1938 | Hughes | 384/538 |
| 3,515,418 | 6/1970 | Nielsen, Jr. | 403/109 |
| 3,880,483 | 4/1975 | Snyder, Jr. | 384/539 |
| 3,920,342 | 11/1975 | Warda | 384/538 X |
| 3,924,957 | 12/1975 | Camosso | 403/352 |
| 4,043,622 | 8/1977 | Hotchkiss et al. | 384/587 |
| 4,138,168 | 2/1979 | Herlitzek | 384/903 X |
| 4,229,059 | 10/1980 | Dever | 384/541 |
| 4,545,627 | 10/1985 | Nakamura et al. | 384/585 |

*Primary Examiner*—Thomas R. Hannon
*Attorney, Agent, or Firm*—King and Schickli

[57] ABSTRACT

A locking mechanism for attaching the inner race of a bearing assembly to a shaft is provided. A locating shoulder and an annular groove of constant depth are positioned on opposite sides of the bearing assembly when mounted on the shaft. An eccentric split ring is placed in the groove and is bodily positioned in a recess formed diametrically across the inner race. One of two opposed stops on opposite sides of the recess engages and cams against an enlarged portion of the ring upon initial relative rotation between the inner race and the shaft. The recess is formed by milling a gap across the end of the inner race.

7 Claims, 2 Drawing Sheets

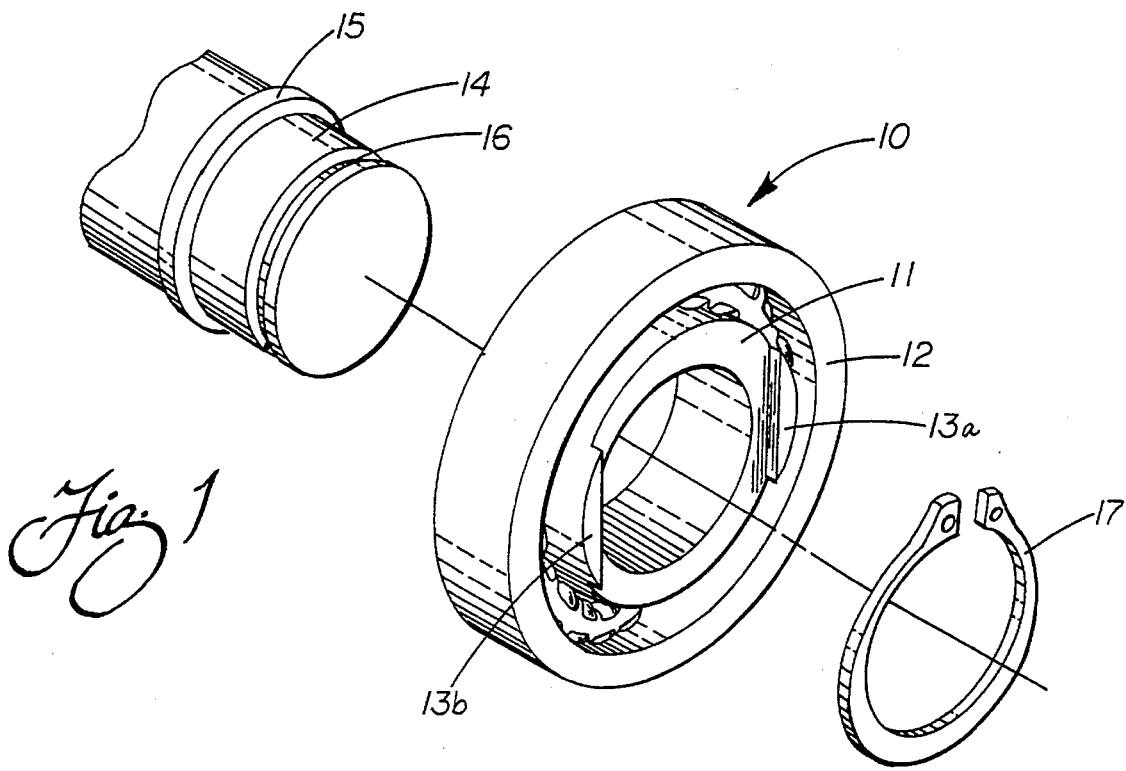
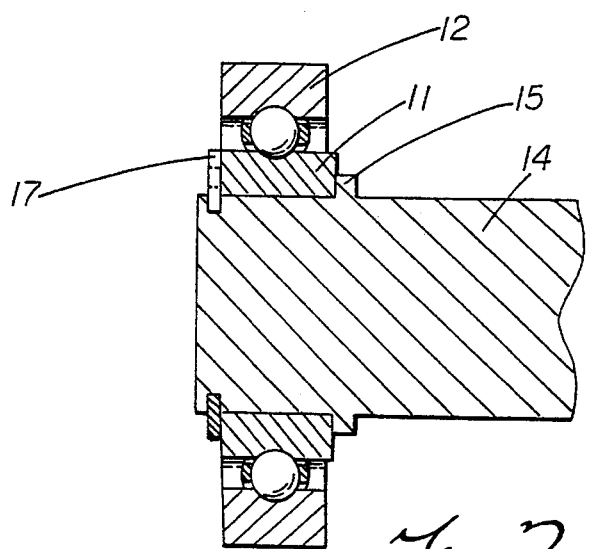

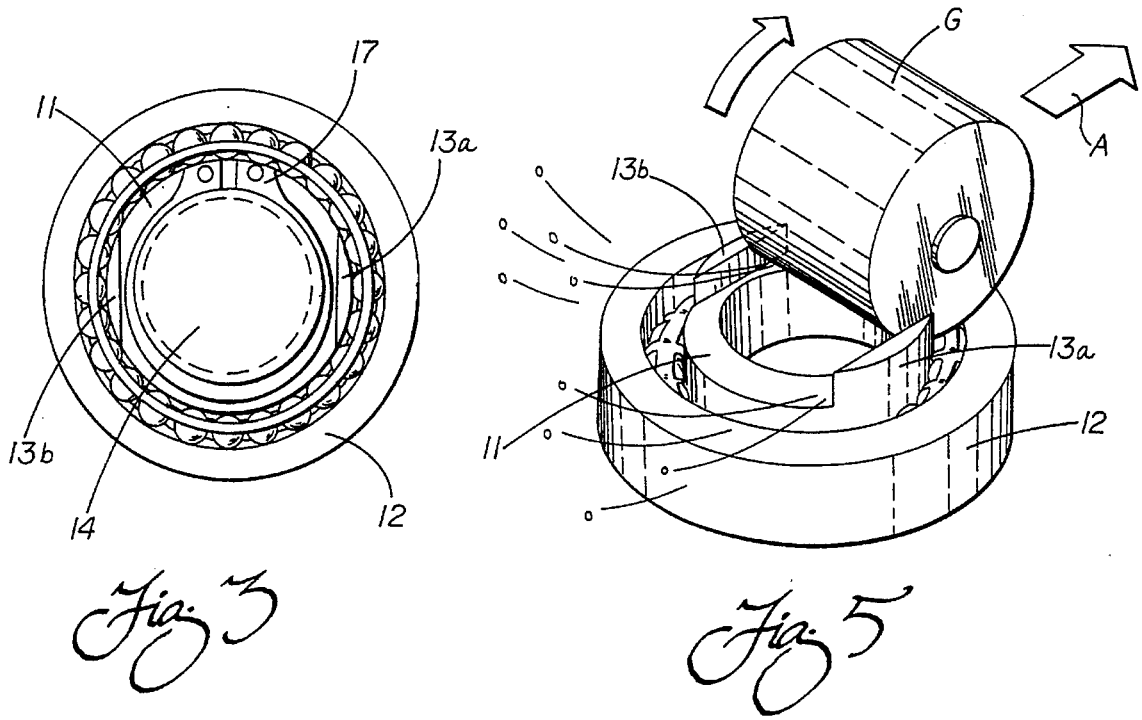
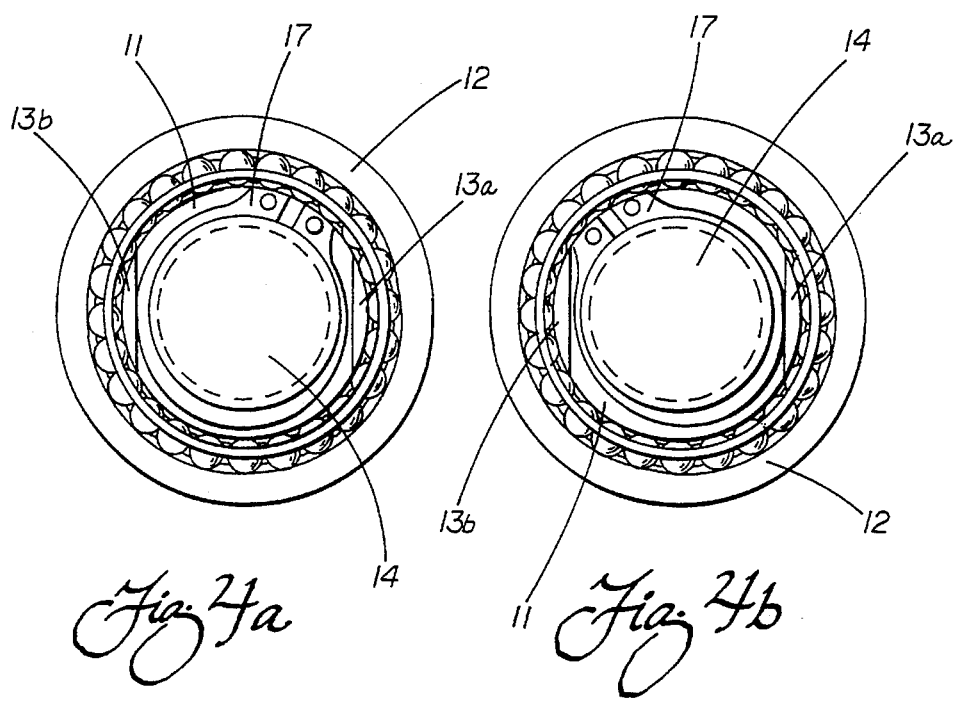

BEARING LOCK SYSTEM

TECHNICAL FIELD

The present invention relates generally to systems for securing an annular component relative to a support, and more particularly to an improved arrangement for securing and locking the inner race of a bearing to a drive shaft or the like on which the bearing is mounted.

BACKGROUND OF THE INVENTION

In modern rotary machinery, bearing assemblies are one of the most important component parts. Low friction operation and reliability are two of the key attributes when OEM manufacturers specify a particular bearing assembly for a product. Another important factor, but one that is sometimes overlooked, or at least not given as much attention as the others, is the ease of installation of the bearing assembly on the shaft, as well as the stability of the locking attachment to the shaft.

As further background, the typical bearing assembly includes an inner race that is locked to and rotates with a shaft. A separate outer race is fixedly connected to a supporting structure, such as the equipment framework or body. Smooth and efficient rotary motion of the inner race within the fixed outer race is achieved by interposing between the inner and outer races a plurality of bearing elements, such as rollers or balls. In other instances, a shaft (or spindle) and inner race may be fixed, and the outer race and a rotary element can then freely rotate.

Several arrangements exist for mounting and locking the inner race of a bearing to a shaft. One such method for effecting this function, and which is used in the vast majority of applications, is press fitting. In order to secure the inner race of the bearing to the shaft by press fitting, first the shaft is manufactured with a slightly oversized cross-sectional diameter as compared to the diameter of the inner race, or vice-versa. The shaft is then forcibly fit into the inner race to effect the tight frictional engagement therewith.

Locking the inner race of the bearing to the shaft by means of press fitting has suffered several shortcomings in the past. First, over time and upon extended use, the metals of the inner race and the shaft tend to seize together making bearing replacement difficult or even impossible. In addition, in order to effectively lock the inner race and shaft together by means of press fitting, these parts must be machined to very close tolerances, often within a few ten-thousandths of an inch. It is sometimes even necessary to heat the inner race of the bearing to cause it to temporarily expand to make it easier to slip over the end of the shaft. In these ways, and in other ways, such limitations result in more expensive bearing component and bearing assembly manufacturing costs. Not only is there intricate machining and heating requirements, but there is the intrinsic high reject rate of parts and finished assemblies. In addition, and perhaps most significantly, there are several manufacturing environments that have proven to be unable to effectively use the press fitting approach.

For example, in the field of modular conveyor systems, there currently exists a need for a low cost, but highly efficient system for mounting the roller/ball bearing assemblies on the drive and support shafts. Because of the enumerated engineering shortcomings identified above, it is desired that the system not involve the press fit concept in any manner. Not only is quick and easy installation important, but also easy removal for replacement is a major concern.

Another method used in the industry to secure the inner race of a bearing to a shaft is the utilization of set screws. In such an arrangement, one or more set screws extend through the inner race so as to engage the face of the shaft. Upon tightening of the set screws, the inner race is in effect clamped and secured to the shaft and rotation relative to the shaft is prevented. This arrangement also in practice exhibits several difficulties and shortcomings. First, in order to allow for the insertion of screws through the inner race, it necessarily is of a substantially greater width and extends well beyond the width of the outer race. Accordingly most set screw type bearing assemblies are wider and less compact than those bearing assemblies utilizing other securing methods. In addition, during extended industrial use, especially in environments where a fair degree of vibration is present, such as in modular conveyor systems, retaining the set screws in place is proven to be a difficult task. Upon being exposed to such vibrations, the set screws inevitably tend to loosen and oftentimes disengage causing the undesirable uncoupling of the drive shaft from the inner race of the bearing. Additionally, the set screws tend to score and gouge the shaft making maintenance procedures more difficult, and this condition even contributes to weakening of the shafts in certain installations. Further, because bearing assemblies using set screws provide contact between the inner race and the drive shaft in only a limited number of points, maximum grip between the inner race and the shaft is not achieved.

In an apparent effort to overcome the difficulties realized with these more common set screw securing devices, eccentric locking collars have also been invented and used in conjunction with the inner race to fixedly lock it onto the shaft. An arrangement of this type is disclosed, for example, in U.S. Pat. No. 4,229,059 to Dever. In such a locking arrangement, the inner race of the bearing is provided with a groove having an eccentric inner diameter in an extension of the inner race. Initially, the inner race of the bearing assembly is placed on the shaft. Next, an eccentric ring is placed in the groove. The eccentric ring has a relatively thick portion which is received in a relatively deep portion of the inner race groove. Next, a spanner wrench is used to rotate the inner race of the bearing with respect to the ring and the shaft, so as to clamp and lock the shaft with the inner race of the bearing assembly. Set screws are still needed to secure the eccentric ring, and thus the inner race, in position.

This basic configuration of eccentric ring locking devices also exhibits notable shortcomings. First, the set screws of the eccentric ring are similarly prone to vibrating loose as the prior art screw configurations. Additionally, an axially elongated inner race is still required and relatively complex machining requirements are still necessary to use a locking device of this type.

A variation of the basic eccentric ring locking mechanism is disclosed in the U.S. Pat. No. 3,924,957 to Camosso. According to this arrangement, the eccentric ring incorporates two locking elements. These locking elements slide towards each other along the eccentric portions of the ring to secure the bearing assembly in place. The shortcomings of this arrangement are much the same as the basic eccentric ring locking devices. Specifically, having to use two interacting elements in addition to the ring, simply means that additional parts are required and prone to working loose over time. Additionally, since the Camosso arrangement necessitates the use of an extended inner race, it is also incapable of use in those manufacturing situations where there are space constraints.

Thus, it is clear that a need exists for a bearing assembly with an improved locking mechanism. Such a bearing assembly would be relatively easily machined and manufactured, would eliminate the need of set screws and would generally minimize the number of parts required to reduce the susceptibility to becoming loose due to mechanical vibrations. The need also exists for such a bearing assembly that is adaptable to those situations where there are space constraints.

SUMMARY OF THE INVENTION

It is therefore a primary object of the present invention to overcome the above described limitations and disadvantages in the prior art related to mounting and retaining bearing assemblies on a shaft.

An additional object of the invention is to provide such a bearing locking system that includes relatively easily machined and low cost components.

Yet another object of the invention is to provide a bearing assembly and locking mechanism that would eliminate set screws and generally utilize a minimum number of components.

Still another object of the present invention is to provide a bearing assembly locking mechanism that eliminates the need for an elongated inner race so as to be adaptable to those manufacturing situations where there are space constraints along the longitudinal axis of the shaft.

Yet another object of the invention is to provide a bearing assembly and locking device capable of being securely locked in place on a rotary shaft wherein a single split ring and a standard bearing with minimum modification are all that is required.

Additional objects, advantages and other novel features of the invention will be set forth in part in the description that follows and in part will become apparent to those skilled in the art upon examination of the following or may be learned with the practice of the invention. The objects and advantages of the invention may be realized and obtained by means of the instrumentalities and combinations particularly pointed out in the appended claims.

To achieve the foregoing and other objects, and in accordance with the purposes of the present invention as described herein, a locking arrangement is provided to effect a reliable and efficient means of mounting and locking an inner race of a standard bearing assembly to a rotary shaft. The invention disclosed can be used in a wide variety of applications. It is especially desirable in those manufacturing, production, or processing situations where it is necessary to utilize bearing assemblies in applications where vibration may be a problem and/or where the bearing assembly must be positioned in a confined space along the longitudinal axis of the shaft.

In the preferred embodiment, the improved locking mechanism pertains to those bearing assemblies comprising inner and outer races separated by a plurality of bearing elements. The inner race of a bearing assembly is mounted on a rotary shaft, or in other instances, is mounted on fixed shaft or spindle.

The locking mechanism includes an annular locating shoulder, or equivalent longitudinal stop means, that extends circumferentially about the rotary shaft. Additionally the rotary shaft is provided near its end with an annular groove disposed about its circumference. In the preferred embodiment, this groove is ideally of substantially uniform depth.

An important feature of the locking arrangement is a diametrically formed recess or gap defining at least one raised stop. A lateral face of the inner race formed by the recess defines the stop. In the preferred embodiment, there are first and second raised stops on opposite sides of the recess, which is formed by a milling operation across the diameter of the inner race of the bearing assembly. Preferably, the first and second opposed raised stops are substantially diametrically opposed from each other across the recess.

The locking arrangement also includes an eccentric split ring inserted into the groove on the shaft and bodily positioned within the plane of the recess of the inner race. Preferably, this ring has a gradual taper around both sides to an enlarged portion formed on the side opposite the split opening.

According to another aspect of the improved locking mechanism, the eccentric split ring is capable of being temporarily spread open and secured into position in the groove of the rotary shaft, while simultaneously being located within the recess between the opposed raised stops. Upon initial relative rotation between the ring and the inner bearing race in either direction, the enlarged portion cams against the first and second stops in the direction of rotation. Accordingly, the eccentric split ring is pressed into the groove, thereby securely locking the inner race of the bearing in position with respect to the rotary shaft.

The implementation of the present invention of an improved locking mechanism or arrangement for a bearing assembly has several key advantages. The locking mechanism of the present invention is comprised of relatively easily machined and inexpensively manufactured components. Additionally, the present locking mechanism eliminates the use of set screws and utilizes a minimum number of components. There can be no loosening of the components due to mechanical vibrations since the eccentric ring simply becomes tighter as the tendency for more relative rotation occurs. Notably, this locking mechanism is especially useful in those situations where there are space constraints as there is no requirement, in contrast to the prior art devices, of having an extended inner race to achieve secure locking. Finally, since the locking mechanism of the present invention effects secure locking without the use of set screws or other sharp fasteners, there is no problem of gouging or otherwise marring the shaft on which the bearing is mounted.

Still other objects of the present invention will become apparent to those skilled in this art from the following description wherein there is shown and described a preferred embodiment of this invention, simply by way of illustration of one of the modes best suited to carry out the invention. As it will be realized, the invention is capable of other different embodiments and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawing incorporated in and forming a part of the specification, illustrate several aspects of the present invention, and together with the description serve to explain the principles of the invention. In the drawing:

FIG. 1 is an exploded perspective view showing the various integral components of the locking mechanism or arrangement of the present invention;

FIG. 2 is a cross-sectional side view of a bearing assembly secured on a rotary shaft by means of the locking mechanism of the present invention;

FIG. 3 is an end view of the locking mechanism of the present invention and illustrating the initial positioning of the eccentric split ring within the recess of the inner race;

FIG. 4A is an end view of the locking mechanism of the present invention showing the eccentric ring camming against one of the raised stops;

FIG. 4B is an end view similar to FIG. 4A, showing the eccentric ring camming against the opposite raised stop; and FIG. 5 is a side view showing a grinding wheel forming the recess with the raised stops on opposite sides of the race of the bearing assembly.

Reference will now be made in detail to the present preferred embodiment of the invention, an example of which is illustrated in the accompanying drawings.

DETAILED DESCRIPTION OF THE INVENTION

Reference is now made to FIG. 1 showing the improved locking mechanism or arrangement for a bearing assembly 10 of the present invention. As will become apparent from the above summary and by reviewing the more detailed description below, the improved locking mechanism of the present invention provides an improved means for locking an inner race 11 of the bearing assembly 10 to a rotary shaft 14. An outer race 12 is mounted to a stationary frame or other supporting structure of a conveyor, or the like (not shown).

As best shown in FIG. 1, the improved locking mechanism includes an annular locating shoulder 15, or equivalent longitudinal stop means, that preferably extends circumferentially around the rotary shaft 14 spaced from one end. The shoulder 15 provides a means for properly aligning and positioning the bearing assembly 10 on the rotary shaft 14. Additionally, an annular groove 16 is provided between the end of the shaft 14 and the locating shoulder 15. Ideally, the groove 16 is of uniform depth, as shown.

The locking mechanism additionally includes at least one raised stop 13a, 13b extending from the sides of a recess formed in the inner race 11 of the bearing assembly 10. In the preferred embodiment, and as best shown in FIGS. 1 and 2, the locking mechanism comprises both first and second raised stops 13a, 13b. Preferably, these stops 13a, 13b are substantially diametrically opposed from each other.

As illustrated in FIG. 5, the recess or gap across the inner race 11 is created by milling. In the preferred method, a grinding wheel G is guided across the outer lateral face of the inner race 11 (see action arrow A in FIG. 5), such as by operation of a typical milling machine. As should be appreciated, the grinding wheel G has a width that is narrower than the diameter of the inner race 11. As a result, upon completion of the milling operation, the first and second stops 13a, 13b are formed and located on opposite sides of the recess. As is readily understood, by designing the locking mechanism of the present invention to include these opposing stops 13a, 13b only one milling operation is required. This simple step can modify a standard bearing assembly in order to adapt it to form an integral component of the locking mechanism.

When the bearing assembly 10 is placed in position on the rotary shaft 14, and in abutment with the locating shoulder 15, groove 16 is aligned with the recess between the stops 13a, 13b. Accordingly, an eccentric split ring 17 may easily be positioned in the groove 16 between the stops 13a, 13b by simply spreading the ends of the ring 17. A conventional spanner wrench (not shown) is used to engage the two apertures on the ends of the ring 17 to perform this operation.

As best illustrated in FIG. 1, the eccentric ring 17 includes a relatively enlarged or widened base portion tapered from the two relatively narrow side portions. As best understood by also considering FIGS. 3 and 4A, 4B, once the end portions are spread apart, the ring 17 is moved over the end of the shaft 14 and rotated to about the 1 o'clock position. The side of the ring adjacent the stop 13a now has sufficient clearance to snap down into the partially locked position in the groove 16. The ring 17 is then rotated to approximately the 11 o'clock position so that the other side of the ring snaps into position. In this manner, the clearance along both sides of the ring 17 with the stops 13a, 13b can be minimized, thus increasing the security of the locking function. Once in the groove 16, the resilient memory of the ring 17 and the camming action caused by the engaged stop 13a, 13b assures that the locking arrangement is secure even under the most severe vibration conditions.

As can be seen in FIG. 2, when all of the components of the locking mechanism of the present invention are in place, the first and second raised stops 13a, 13b of the inner race 11 are substantially coplanar with the recess across the inner race 11 of the bearing assembly 10. As should thus be appreciated, this arrangement provides a narrower profile then heretofore available in prior art bearing assemblies. Accordingly, the bearing assembly is especially adaptable for those production uses where space along the shaft is at a premium, such as for use in mounting sprockets or rollers to support a modular conveyor.

The locking of the inner race 11 in place with respect to the rotary shaft 14 is initially automatic. Once the shaft 14 is rotated in either direction thus slightly rotating the eccentric split ring 17 with respect to the inner race 11, the enlarged portion of the ring 17 cams against one of the raised stops 13a, 13b, depending on the direction of the applied rotation. The enlarged portion of the eccentric ring 17 is tightly pressed into the groove 16 (see FIGS. 4A, 4B), thus locking the inner race 11 with respect to the rotary shaft 14.

As indicated above, as greater rotational torque is applied during rotation, the holding force of the ring 17 in the groove 16 tends to correspondingly increase. Accordingly, the locking mechanism of the present invention not only provides an effective locking means regardless of the shaft rotational direction, but actually increases in effectiveness when needed most.

An additional feature of the present invention is that the locking mechanism is easily unlocked to allow removal and replacement of the bearing assembly. While holding the shaft 14 against rotation, the installation process is simply reversed (see FIGS. 4A and 4B). Accordingly, the bearing assembly utilizing the locking mechanism of the present invention can be readily removed from the shaft 14 for cleaning and maintenance operations of the conveyor or similar machine in which it is being used.

In summary, numerous benefits have been described and are apparent from employing the concepts of the present invention. The locking mechanism is comprised of a minimum number of easily manufactured components, rendering it not only more economical to manufacture, but also more reliable in operation. This is especially important in an environment that subjects the shaft 14 to relatively heavy vibration, such as in a conveyor. Also, the bearing assembly 10 is very well adapted to those production applications where there are space constraints. In addition, there is no need for the use of set screws or the like that can vibrate loose, and in addition tend to mar the surface of the shaft.

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as is suited to the particular use contemplated. All such modifications and variations are within the scope of the invention as determined by the appended claims when interpreted in accordance with breadth to which they are fairly, legally and equitably entitled.

We claim:

1. A locking mechanism for an annular component to a shaft comprising:

means for locating said component along the longitudinal axis of said shaft;

an annular groove formed in the peripheral surface of said shaft on the opposite side of said component;

a recess extending diametrically across said component aligned with said groove;

at least one raised stop formed by a lateral face of said recess on said annular component;

an eccentric ring seated in said groove and positioned substantially in the plane of said recess;

said ring being split to form an opening to allow installation and removal from said groove;

said ring also having an enlarged portion to engage and cam against said face upon initial relative rotation between said component and said shaft;

whereby said component is locked against rotation relative to said shaft by pressing of said ring tightly into said groove.

2. The locking arrangement of claim 1, wherein said annular component is a bearing assembly including an inner race mounted on said shaft.

3. The locking mechanism of claim 2, wherein is provided another stop formed on the opposite side of said recess so that the locking of the inner race of the bearing surface takes place in either direction of initial rotation.

4. The locking mechanism of claim 3, wherein said stops are substantially diametrically opposed on opposite sides of said recess.

5. The locking mechanism of claim 2, wherein said recess is formed by a milled gap across the inner race of said bearing assembly.

6. The locking mechanism of claim 1, wherein said enlarged portion of said eccentric ring is positioned substantially opposite said opening.

7. The locking mechanism of claim 1, wherein said groove is of substantially constant depth.

* * * * *